Oct. 11, 1927.
S. L. YOUNG
1,645,493
LEAF SPRING COVER OR WRAPPER
Filed Sept. 18, 1924
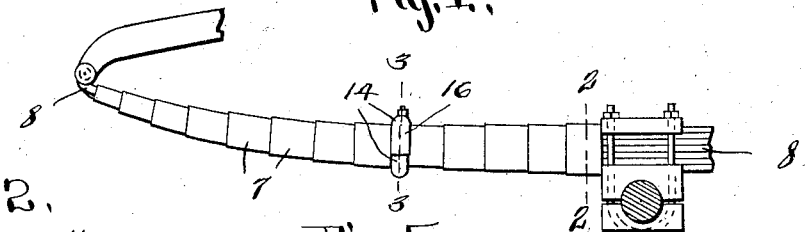
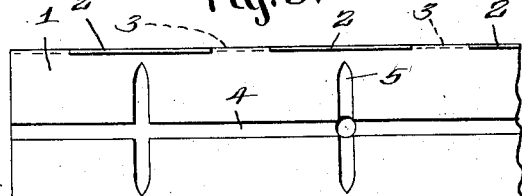
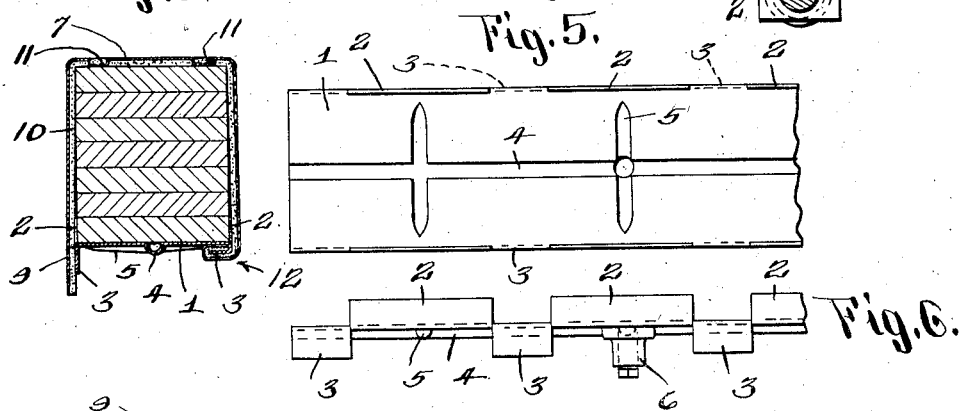
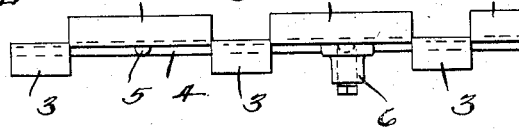
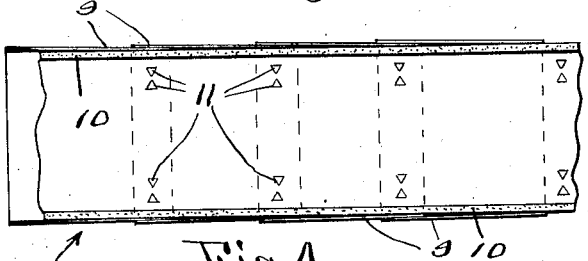
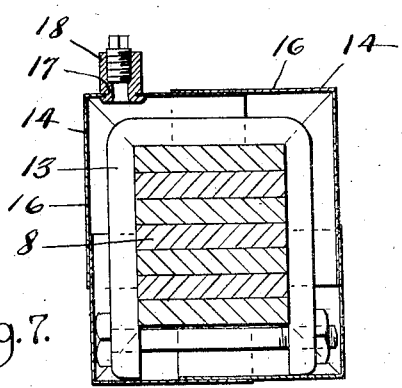
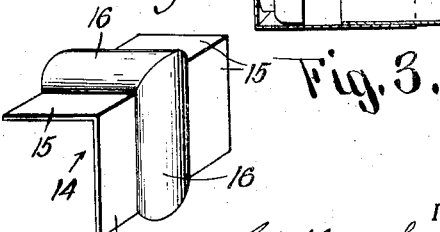
INVENTOR.
Stephen L. Young.
BY
Parsons & Brodell.
ATTORNEYS.

Patented Oct. 11, 1927.

1,645,493

UNITED STATES PATENT OFFICE.

STEPHEN L. YOUNG, OF SYRACUSE, NEW YORK.

LEAF-SPRING COVER OR WRAPPER.

Application filed September 18, 1924. Serial No. 738,371.

This invention has for its object a metallic wrapper or cover for these springs, such as are used in automobiles, and has for its object a spring wrapper or cover, which is particularly simple and economical in construction, highly efficient and durable and oil and grease tight in use, and which is readily applied to the springs.

The invention consists in the novel features and in the combinations and constructions hereinafter set forth and claimed.

In describing this invention, reference is had to the accompanying drawings in which like characters designate corresponding parts in all the views.

Figure 1 is a side elevation of this spring leaf wrapper showing the same applied to the spring.

Figure 2 is a transverse sectional view on line 2—2, Fig. 1.

Figure 3 is a sectional view on line 3—3, Fig. 1.

Figure 4 is an inner face view of the U-shaped section.

Figures 5 and 6 are respectively a plan and an edge view of the base strip.

Figure 7 is a detail view of one of the sections of the spring clip cover.

This spring leaf cover comprises generally a base strip arranged to extend lengthwise of the spring, a plurality of U-shaped sections designed to extend astride the spring, the side portions of the U-shaped sections and the strip having means by which said side portions are attachable to the strip. It further includes adjustable means composed of angular sections for inclosing the spring clips, which angular sections are held in place by the U-shaped sections.

1 designates the base strip which may be of any suitable form, size and construction, it being here shown as formed with flanges 2, 3 at each edge thereof, the flanges 2 alternating with the flanges 3 and such flanges 2 being arranged to lap the sides of the spring and hold the base piece centered or from lateral movement while the sections are being connected thereto, and the flanges 3 being arranged to be attached to the side pieces of the U-shaped sections. The strips 1 are also formed with a lengthwise corrugation 4 and transverse corrugations 5 and may be provided with a coupling at 6 at the intersection of the groove 4 and one of the grooves 5.

7 designates the U-shaped sections, these being bent to shape the spring, that is, being of the same width as the spring 8 and the side portions 9 thereof being of any suitable standard length. The sections 7 are arranged to lap each other and are usually attached to a lining 10 common to a plurality of sections, this lining being of felt or other suitable material and the sections being secured thereto by prongs 11 struck from the margins thereof lapped by adjacent sections, these prongs being clinched into the felt lining. The sides 9 of the sections 7 are preferably attached to the base strip 1 by a lock seam joint formed by first folding the end margins of the sides around the flanges 3 (cutting off the ends of the sides if they are too long to be folded on the flanges 3) and then folding or flattening the flanges 3 inwardly with the portions 9 locked around them flatwise on to the lower side of the strip 1, thus forming a lock seam joint 12. Preferably, the lining 10 extends into the lock seam joint 1.

In some cases, it may be preferable and in other cases objectionable to remove the spring clips 13 and therefore I provide a cover for the spring clips 13, which cover is adjustable to the various sizes and thicknesses of the springs or spring leaves.

Each spring clip cover comprises a plurality or four angular duplicate sections 14 having a lapping or telescoping movement relatively to each other, these sections having base flanges 15 and corrugations 16 for receiving the spring clips, the flanges 15 being wrapped or inclosed by the contiguous U-shaped sections 7 and the end of the base strip 1, so that the spring clip cover sections are held in position by such sections 7 and the base strip 1.

One of the sections 14 may be provided with an opening 17 for receiving an oil cup or grease cup or connection 18 for an oil or grease gun. When oil is used, the section provided with the oil cup or coupling is usually placed on the upper side of the spring and when grease is used, such section with the coupling for a grease gun coupling is placed on the lower side of the spring.

In operation, the U-shaped sections 7 and the base strips are made up of widths corresponding to the widths of standard springs, used on automobiles. The base strip may be of any length or lengths as it can be easily cut off. Any number of U-shaped sections may be secured to one lining as the sections can be separated and the lining cut off. The base strip is usually applied to the under side of the spring and the sections 7 and their linings arranged astride the spring. Also the spring clip cover sections if used are placed in position and then the sides of the U-shaped sections 7 attached to the base strip by a lock seam joint.

This leaf spring cover is particularly advantageous in that the cover can be quickly applied and adjusted or fitted to the spring, and it is not necessary to build a different spring cover for each different length of spring but only to make the base strip and the U-shaped sections in the widths of standard springs, it being understood that in motor vehicles the springs vary greatly in length, although they are all of standard widths.

What I claim is:

1. A cover for leaf springs comprising a base strip extending lengthwise of the spring, a plurality of sections arranged to lap each other, the sections being U-shaped and designed to be arranged astride of the spring, the base strip and the sections having lapping flanges arranged to be folded together to form a joint at the corners of the spring.

2. A cover for leaf springs comprising a base strip arranged to extend lengthwise of the spring and formed with marginal flanges at each edge, the flanges at each edge extending in opposite directions whereby some of the flanges lap the sides of the spring, a plurality of U-shaped strips common to each base strip, the strips lapping each other and the side portions thereof being arranged to be interlocked with other flanges of the base strip to form a lock seam joint.

3. A cover for leaf springs comprising sections arranged to inclose the spring and sections arranged to inclose the spring clips, the latter comprising four sections arranged to overlap each other, each section being angular in form and provided with outwardly extending base flanges and a corrugation between the flanges for receiving the spring clip, the former sections being arranged to inclose the base flanges of the latter sections.

4. A wrapper for spring leaves comprising a plurality of U-shaped sections lapping each other, a base strip, the base strip and the sections being provided with coacting means for securing the sides of the sections thereto, a spring clip cover comprising angular lapping sections formed with base flanges arranged to be inclosed by the adjacent contiguous U-shaped sections, and the contiguous portion of the base strip and with corrugations arranged to receive the clips.

In testimony whereof, I have hereunto signed my name, at Syracuse, in the county of Onondaga, and State of New York, this 12th day of Sept. 1924.

STEPHEN L. YOUNG.